3,173,925
**PRODUCTION OF 4-DISUBSTITUTED
1,3-DIOXOLONES(5)**
Wolfgang Seeliger, Porz, Rhine, Germany, assignor to Chemische Fabrik Kalk Gesellschaft mit beschränkter Haftung, Cologne-Kalk, Germany
No Drawing. Filed July 5, 1962, Ser. No. 207,782
Claims priority, application Germany, Nov. 14, 1961, C 25,498
1 Claim. (Cl. 260—340.2)

The present invention relates to an improved process for the production of 1,3-dioxolone(5) compounds carrying two substituents in position 4.

It is known that 1,3-dioxolone(5) compounds carrying only one substituent in position 4 can be prepared in moderate yields by heating derivatives of glycolic acid, carrying an alkyl or aryl group on the α carbon atom, with aldehydes or ketones in benzene to temperatures of 150 to 160° C. in a closed tube. These yields are only obtained in the presence of acid catalysts which, such as, for example, p-toluene sulfonic acid, favor the formation of 1,3-dioxolone(5) compounds from hydroxy carboxylic acids and carbonyl compounds.

Such process furthermore is not generally applicable. For example, lactic acid does not react with benzaldehyde or cinnamic aldehyde to produce the corresponding 1,3-dioxolone(5) compounds. As an example of a 4-monosubstituted 1,3 dioxolone which can be thus prepared, 2,2-dimethyl-4-phenyl-1,3-dioxolone(5) can be produced by heating mandelic acid with a large excess of acetone in concentrated sulfuric acid.

1,3-dioxolone(5) compounds carrying two substituents in position 4 can also be produced from polyoxymethylene and α hydroxy butyric acid by dissolving the starting materials in benzene and heating in a closed tube to 150–160° C. in the presence of acid catalysts. As in the analogous production of the 4 monosubstituted compounds, the yields of the 4 disubstituted compounds are not very high.

Considerably better yields can be obtained by another known process by reacting α formyl isobutyric acid chloride with alkyl zinc iodide. In view of the cumbersome method required for the production of the α formyl isobutyric acid chloride employed as a starting material and the necessity of carrying out the reaction thereof with alkyl zinc iodide in a water free medium, this procedure is too costly for large scale technical production of 4-disubstituted 1,3-dioxolone(5) compounds.

It is therefore an object of the invention to provide a process for the production of 1,3-dioxolone(5) compounds carrying two substituents in position 4 in good yields from easily available starting materials.

In the process according to the invention 1,3-dioxolone(5) compounds carrying two substituents in position 4 are produced by warming a mixture of an α hydroxy carboxylic acid and a carbonyl compound containing an acid catalyst and also, if desired, a solvent. According to such process a mixture containing an α hydroxy carboxylic acid carrying 2 hydrocarbon radicals on the α carbon atom and a carbonyl compound in a molar ratio of 1:0.8 to 1.5 as well as a small quantity of a strongly acid acting substance of a catalyst is heated under normal atmospheric pressure to boiling and 1 mol of water, as well as any water introduced with the starting materials, distilled off.

All α hydroxy carboxylic acids carrying two substituents on the α carbon atoms in addition to the hydroxy group as in α hydroxy isobutyric acid or 2-methyl-2-hydroxy butyric acid are suitable for the process of the invention. The substituents can be alkyl, aryl or alkaryl groups in which heteroatoms may also be built in as substituents. Such substituents on the α carbon atom of the α hydroxy carboxylic acid form the substituents in position 4 of the 1,3-dioxolone(5) compounds produced according to the invention.

All aldehydes as well as ketones as well as substances from which such substances can be set free can be used as the carbonyl compound for reaction with the α hydroxy carboxylic acid according to the invention. Even branch chained and relatively inactive aldehyde or ketones and especially those in which the carbonyl group stands in conjugation with an unsaturated system can be employed as starting materials for the process according to the invention. Advantageously known polymerization inhibitors are added when the carbonyl compounds are of a type that tends to polymerize. The radicals connected to the carbonyl group can also contain heteroatoms as substituents and/or functional groups. Such radicals form the substituents in position 2 of the 1,3-dioxolone(5) compounds produced according to the invention. Advantageously, a water immiscible solvent, such as petroleum ether, benzene, toluene and the like, the boiling point of which is under that of the carbonyl compound, is added to the reaction mixture. In the event that the carbonyl compound concerned is water immiscible, it is possible to use an excess thereof instead of a solvent such as indicated above.

It is also advantageous to add small quantities of catalysts promoting formation of 1,3-dioxolone(5) compounds from α hydroxy carboxylic acids and carbonyl compounds to the reaction mixture. Strongly acid acting organic compounds such as p-toluene sulfonic acid have proved particularly suitable as such catalyst. However, other acid acting compounds, such as concentrated sulfuric acid, zinc chloride or polymer products which, such as Amberlite IR 120, act as ion exchangers, can be employed as the catalyst.

The reaction mixture thus prepared is heated to boiling and one mol of water driven off for every mol of α hydroxy carboxylic acid originally contained in such mixture. In addition it is, of course, also necessary to distill off any water which may have been introduced into the mixture by the starting materials. In most instances the water forms an azeotropic mixture with the solvent or the carbonyl compound employed. As a consequence the reaction mixture advantageously is heated in a reaction vessel provided with a reflux condenser and water trap.

After the water has been driven off the solvent which may be present in the reaction mixture or the excess carbonyl compound is distilled off. Then the 1,3-dioxolone(5) compound formed can be separated off or distilled off from the residue with sufficient purity for most technical purposes. If higher purity requirements must be met the product can be purified further by repeated distillation or recrystallization.

The distillation residues and the solvent or excess carbonyl compound driven off can be recycled to the process. A fresh reaction mixture produced using the residue remaining after distilling off the 1,3-dioxolone(5) produced in a previous batch does not require addition of any further catalyst as the catalyst contained in the residue retains its full activity.

The 1,3-dioxolone(5) compounds disubstituted in position 4 produced according to the invention can be employed as intermediates in the production of derivatives of α hydroxy carboxylic acids, such as, for example, the formation of esters of α hydroxy carboxylic acids with alcohols difficult to esterify. With suited carbonyl components, such as, for example, chloral, the compounds produced have herbicidal activity. In addition, those 1,3-dioxolone(5) compounds disubstituted in position 4 produced according to the invention which are liquid possess good solvent properties.

The following examples will serve to illustrate several embodiments of the invention. The proportions are given in parts or percent by weight unless otherwise specified.

Example 1

312 parts of α hydroxy isobutyric acid, 90 parts of paraformaldehyde and 3 parts of p-toluene sulfonic acid monohydrate were mixed with 175 parts of benzene. The mixture was boiled in a vessel provided with a reflux condenser and water trap until about 56 parts of an aqueous layer had been separated off in the water trap. After the benzene had been driven off from the reaction mixture in the vessel, 306 parts (88% of the theoretical) of technically pure 4,4-dimethyl-1,3-dioxolone(5) with a boiling point of 146–148° C. were distilled off at 760 mm. Hg.

Example 2

52 parts of α hydroxy isobutyric acid, 36 parts of isobutyraldehyde and 5 parts of p-toluene sulfonic acid monohydrate were mixed with 60 parts of petroleum ether (B.P. 40–60° C.). The mixture was boiled in a vessel provided with a reflux condenser and water trap until about 9 parts of an aqueous layer had been separated off in the trap. After driving off the petroleum either from the reaction mixture, 64 parts (81% of the theoretical) of technically pure 4,4-dimethyl-2-isopropyl-1,3-dioxolone(5) were distilled off at a boiling point of 73 to 75° C. at 12 mm. Hg.

An analysis of this novel 1,3-dioxolone(5) derivative gave C=60.58%, H=8.81%. (Calculated C=60.74%, H=8.92%.)

Example 3

52 parts of α hydroxy isobutyric acid were mixed with 46.8 parts of isobutyraldehyde and 5 parts of p-toluene sulfonic acid monohydrate and the mixture boiled in a vessel provided with a reflux condenser and water trap until 9 parts of aqueous phase had separated off in the trap. After driving off the excess isobutyraldehyde, 75 parts (95% of the theoretical) of technically pure 4,4-dimethyl-2-isopropyl-1,3-dioxolone(5) were distilled off from the reaction mixture. The product was identical with that obtained according to Example 2.

Example 4

The catalysts referred to in the following table were each introduced into a mixture of 52 parts of α hydroxy isobutyric acid and 46.8 parts of isobutyraldehyde. The mixtures thus obtained were processed as in Example 3. The yields of 4,4-dimethyl-2-isopropyl-1,3-dioxolone(5) obtained are also given in the table.

| Catalyst | | Conversion of the α hydroxy isobutyric acid in percent | Yield of 1,3-dioxolone (5) | |
| --- | --- | --- | --- | --- |
| Type | Quantity in parts | | Parts | In percent with reference to α hydroxy isobutyric acid supplied |
| None | | | 63 | 21.9 | 27.7 |
| p-Toluene sulfonic acid monohydrate | 0.5 | 100 | 75.0 | 95.0 |
| Conc. sulfuric acid | 0.5 | 83 | 56.4 | 71.5 |
| 85% Phosphoric acid | 1.5 | 86 | 26.1 | 33.1 |
| Zinc chloride | 1.0 | 100 | 61.0 | 77.0 |
| Amberlite IR 120 | 5.0 | 62 | 35.5 | 44.6 |

Example 5

52 parts of α hydroxy isobutyric acid, 63.1 parts of benzaldehyde and 5 parts of p-toluene sulfonic acid monohydrate were mixed with 88 parts of benzene. The resulting mixture was boiled in a vessel provided with a reflux condenser and a water trap until about 9 parts of aqueous phase were separated off in the trap. After driving off the benzene, 88 parts (81.5% of the theoretical of technically pure, 4,4 - dimethyl-2-phenyl - 1,3 - dioxolone(5) were distilled off from th reaction mixture with a boiling point of 137–140° C. at 11 mm. Hg.

An analysis of this novel 1,3-dioxolone(5) derivative gave C=68.51%, H=6.21%. (Calculated C=68.73%, H=6.29%.)

Example 6

17.2 parts of α hydroxy butyric acid, 25 parts of p-nitrobenzaldehyde and 0.86 part of p-toluene sulfonic acid monohydrate were mixed with 88 parts of toluene and the resulting mixture boiled in a vessel provided with reflux condenser and water trap until about 2.6 parts aqueous phase had separated out in the trap. After the toluene had been driven off under vacuum the residue of the reaction mixture crystallized. The resulting crude product was washed several times with ethanol. The washed residue of 35 parts (89% of the theoretical) of technically pure 4,4 - dimethyl-2-p-nitrophenyl - 1,3 - dioxolone(5) had a melting point of 98–99° C.

An analysis of this novel 1,3-dioxolone(5) derivative gave C=55.43%, H=4.51%, N=5.86%. (Calculated C=55.69%, H=4.67%, N=5.90%.)

Example 7

52 parts of 2 hydroxy isobutyric acid, 54 parts of cinnamic aldehyde and 1.5 parts of p-toluene sulfonic acid monohydrate were mixed with 88 parts of benzene and the mixture boiled as in the previous Examples until about 7.5 parts of aqueous phase had separated out in the water trap. After driving off the benzene the residue of the reaction mixture crystallized. 66 parts (74% of the theoretical) of 4,4 - dimethyl - 2-styryl-1,3-dioxolone(5) were distilled off from such residue under a vacuum of 1.5 mm. Hg. The melting point of such product was 77° C.

An analysis of this novel 1,3-dioxolone(5) derivative gave C=71.33%, H=6.39%. (Calculated C=71.54%, H=6.46%.)

Example 8

104 parts of α hydroxy isobutyric acid, 108 parts of methyl ethyl ketone and 3 parts of p-toluene sulfonic acid monohydrate were mixed with 88 parts of benzene and the mixture boiled as in the preceding examples until 18 parts aqueous phase had separated out in the water trap. After driving off the benzene, 125 parts (79% of the theoretical) of 2,4,4-trimethyl-2-ethyl-1,3-dioxolone(5) were distilled off from the reaction mixture with a boiling point of 62–65° C. at 12 mm. Hg.

An analysis of this novel 1,3-dioxolone(5) derivative gave C=60.38%, H=8.91%. (Calculated C=60.74%, H=8.92%.)

Example 9

52 parts of α hydroxy butyric acid, 49 parts of cyclohexanone and 1.5 parts of p-toluene sulfonic acid monohydrate were mixed with 66 parts of benzene and the mixture boiled as in the previous Examples until about 9 parts of aqueous phase had separated off in the water trap. After driving off the benzene, 87 parts (94% of the theoretical) of 4,4-dimethyl-2,2-pentamethylene-1,3-dioxolone(5) were distilled off from the reaction mixture at 104–107° C. and 14 mm. Hg. The product upon recrystallization from petroleum ether had a melting point of 44–45° C.

An analysis of this novel 1,3-dioxolone(5) derivative gave C=65.40%, H=8.29%. (Calculated C=56.28%, H=8.77%.)

Example 10

33.6 parts of α hydroxy-α-methyl-n-butyric acid were mixed with 108 parts of isobutyraldehyde and 1.7 parts of p-toluene sulfonic acid monohydrate. This mixture was boiled as in the previous Examples until about 4.5 parts of aqueous phase had separated out in the water trap.

After driving off about 90 parts of isobutyraldehyde (the excess used as solvent) 35.5 parts by weight (82.5% of the theoretical) of 4-methyl-4-ethyl-2-isopropyl-1,3-dioxolone(5) with a boiling point of 77–70° C. at 11 mm. Hg were distilled off from the reaction mixture.

An analysis of this novel 1,3-dioxolone(5) derivative gave C=62.54%, H=9.31%. (Calculated C=62.73%, H=9.36%.)

Example 11

33.6 parts of α-methyl-α-hydroxy-n-butyric acid, 26.5 parts of benzaldehyde and 1.7 parts p-toluene sulfonic acid monohydrate were mixed with 88 parts of toluene and such mixture boiled as in the previous examples until about 4.5 parts of aqueous phase had separated out in the water trap. After driving off the toluene, 42 parts (81% of the theoretical) of 4-methyl-4-ethyl-2-phenyl-1,3-dioxolone(5) with a boiling point of 148–150 C. at 13 mm. Hg were distilled off from the reaction mixture.

An analysis of this novel product gave C=69.80%, H=6.81%. (Calculated C=69.88%, H=6.84%.)

Example 12

62 parts of α hydroxy isobutyric acid, 82.7 parts of chloral hydrate and 0.5 part of p-toluene sulfonic acid were mixed with 218 parts of benzene and the mixture boiled as in the previous examples until about 18 parts of aqueous phase had separated out in the water trap. After distilling off the benzene, 113.5 parts of residue remained which solidified on cooling. After recrystallization from a mixture of ligroin (B.P. 90–110° C.) and water-methanol (3:1), 105.3 parts (90% of the theoretical) of 4,4-dimethyl-2-trichloromethyl-1,3-dioxolone(5) with a melting point of 71–72° C. were obtained.

Example 13

59.5 parts of atrolactic acid-monohydrate, 36.5 parts of methyl ethyl ketone and 1.5 parts of p-toluene sulfonic acid were mixed with 33 parts of petroleum ether (B.P. 40–70° C.) and the mixture boiled as in the previous examples until no further aqueous phase separated out in the water trap. After driving off the solvent, the residue was distilled under vacuum and the fraction going over at 147–150° C. at 9 mm. Hg collected. 39.8 parts (72.5% of the theoretical) of 2,4-dimethyl-2-methyl-4-phenyl-1,3-dioxolone(5) were obtained.

An analysis of this product gave C=70.69%, H=7.28%. (Calculated C=70.87%, H=7.32%.)

I claim:

Process for the production of 1,3-dioxolones(5) carrying 2 substituents in position 4 which comprises heating a mixture of an α hydroxy carboxylic acid also carrying 2 hydrocarbon substituents on the α carbon atom, a carbonyl compound selected from the group consisting of aldehydes and ketones in a molecular ratio of 1:0.8 to 1.5 and a water immiscible organic solvent having a lower boiling point than said carbonyl compound in contact with a catalytic amount of p-toluene sulfonic acid as catalyst to boiling at atmospheric pressure collecting the distillate, separating the water separating out of the distillate from the organic phase, returning such organic phase to the boiling mixture, continuing the boiling until 1 mol of water per mol of α hydroxy carboxylic acid in the starting mixture as well as any water introduced into such mixture with the starting materials has been separated out from the distillate and subsequently distilling the residue and collecting the 1,3-dioxolone(5) product.

References Cited by the Examiner

UNITED STATES PATENTS

| | | | |
|---|---|---|---|
| 1,962,157 | 6/34 | Seymour | 260—340.2 |
| 2,911,414 | 11/59 | Simmons | 260—340.2 |
| 2,936,310 | 5/60 | Beets et al. | 260—340.2 |

IRVING MARCUS, *Primary Examiner.*

NICHOLAS S. RIZZO, *Examiner.*